United States Patent [19]

Geberth, Jr.

[11] Patent Number: 4,626,004
[45] Date of Patent: * Dec. 2, 1986

[54] FLUID SWIVEL COUPLING

[76] Inventor: John D. Geberth, Jr., 10 Goose Cove La., Ramsey, N.J. 07446

[*] Notice: The portion of the term of this patent subsequent to Jun. 21, 2000 has been disclaimed.

[21] Appl. No.: 482,219

[22] Filed: Apr. 5, 1983

[51] Int. Cl.4 .............................................. F16L 27/00
[52] U.S. Cl. .................................. 285/122; 285/164; 285/168; 285/274; 285/276; 239/587
[58] Field of Search ............... 285/122, 123, 164, 168, 285/272, 274, 276; 239/587

[56] References Cited

U.S. PATENT DOCUMENTS

| 991,501 | 5/1911 | Graves | 285/168 |
|---|---|---|---|
| 2,176,295 | 10/1939 | Creveling | 285/274 |
| 4,231,318 | 11/1980 | Zink | 427/209 |
| 4,260,306 | 4/1981 | Weis | 408/104 |
| 4,389,017 | 6/1983 | Geberth | 239/455 |
| 4,463,499 | 8/1984 | Fritz | 16/DIG. 12 |

FOREIGN PATENT DOCUMENTS 845252 8/1960 United Kingdom ................ 285/272

Primary Examiner—Cornelius J. Husar
Assistant Examiner—Eric K. Nicholson
Attorney, Agent, or Firm—Collard, Roe & Galgano

[57] ABSTRACT

A fluid swivel coupling is provided for interconnecting two fluid conduits so as to permit relative rotational movement between the interconnected fluid conduits about two axes at the coupling which are perpendicular to each other. The swivel coupling includes a swivel body connectable to a fluid conduit and adapted to accept for rotational movement a spindle member including a "U" shaped yoke rotatingly supporting a fluid conduit connector between the arms thereof. The swivel coupling is provided with a passageway between the interconnected fluid conduits which is continuous and remains uninterrupted throughout the range of movement of the swivel coupling.

17 Claims, 3 Drawing Figures

FLUID SWIVEL COUPLING

The present invention relates generally to a fluid swivel coupling used for the purpose of interconnecting two fluid conduits and, more particularly, it relates to a fluid swivel coupling which permits relative rotational movement between the interconnected fluid conduits about two perpendicular axes.

Swivel couplings are frequently utilized in connecting together fluid conduits where it is necessary or desirable to have one fluid conduit swivel or rotate about the interconnecting axis with respect to the other connected fluid conduit. Such couplings are especially useful in connecting a fluid conduit to a hand held device such as a paint spray gun where maneuverability is essential to the satisfactory operation of the spray gun. Such a swivel coupling may consist of a swivel body having a bore therethrough for accepting for rotational movement a spindle member which is engaged within the bore to prevent axial movement between the swivel body and the swivel member. At each end of this assembly a connecting means is provided so that fluid conduits can be connected to the swivel body and the spindle member with the result that the fluid conduits rotate about the axis connecting them.

It can be readily appreciated that when used in conjunction with a device such as a paint spray gun, such a coupling aids the spray gun operator by lending some additional maneuverability to the use of a spray gun. However, even with such a swivel coupling the extent of the spray gun maneuverability is still limited since the fluid conduit is restricted to rotating only about the single interconnecting axis at the swivel coupling.

It is, therefore, a primary object of the present invention to provide a fluid swivel coupling which greatly increases the maneuverability between interconnected fluid conduits or between a spray gun and the fluid conduit supplying paint to the gun.

The above object, as well as others which will hereinafter become apparent, is accomplished in accordance with the present invention by providing a fluid swivel coupling which permits relative rotational movement between interconnected fluid conduits about two perpendicular axes. The fluid coupling includes a swivel body connectable to a fluid conduit, the swivel body having an axial bore therein, adapted to accept for rotational movement the spindle member of an assembly which includes a "U" shaped yoke whose arms rotatingly support a fluid conduit connector therebetween. The swivel coupling is provided with a fluid passageway between the interconnected fluid conduit which is continuous and remains uninterrupted throughout the range of movement of the swivel coupling.

The present invention will be described and understood more readily when considered together with the accompanying drawings, in which.

Figure 1:
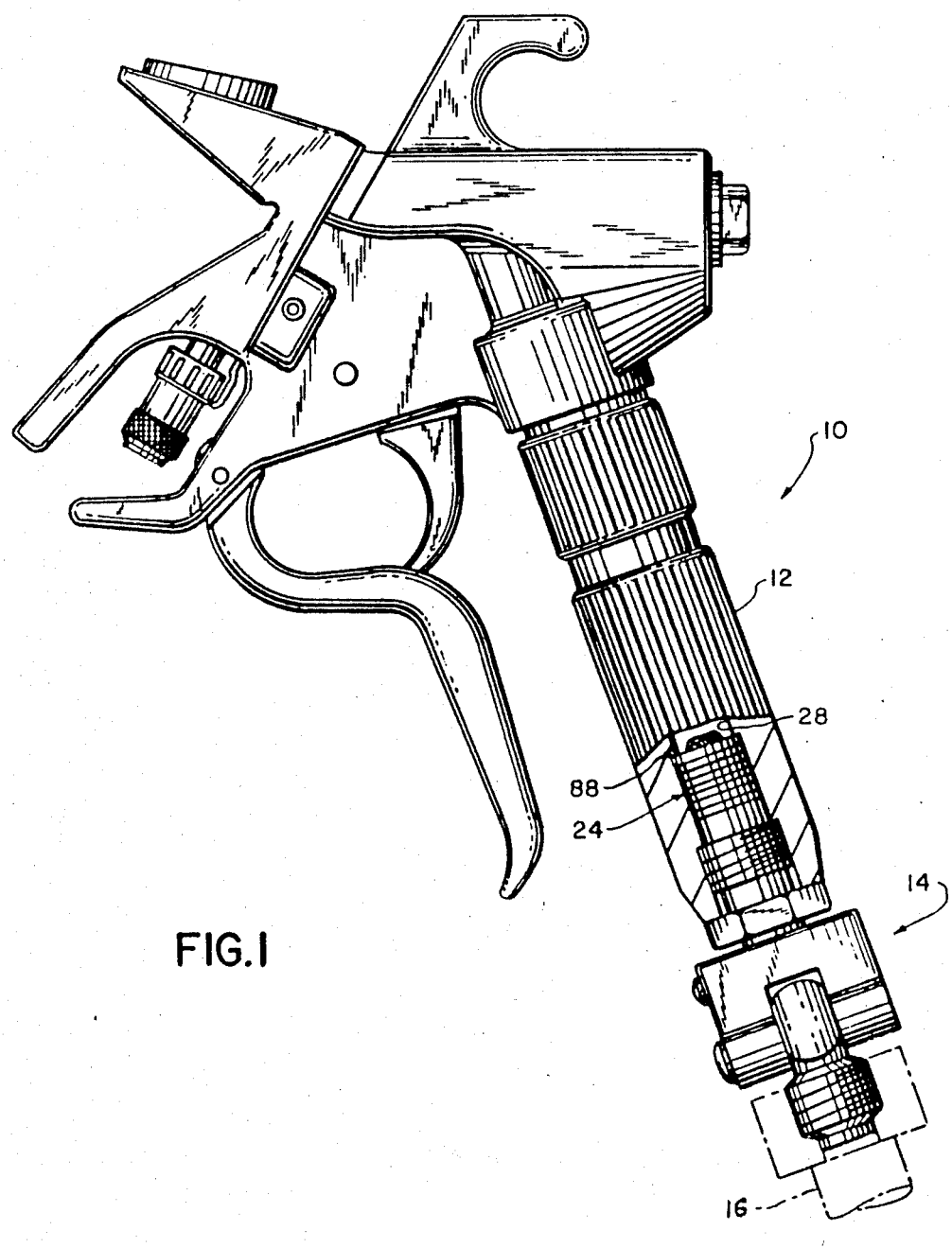
FIG. 1 is a side elevational view of a paint spray gun, partly broken away, showing the fluid swivel coupling of the present invention.
Figure 2:
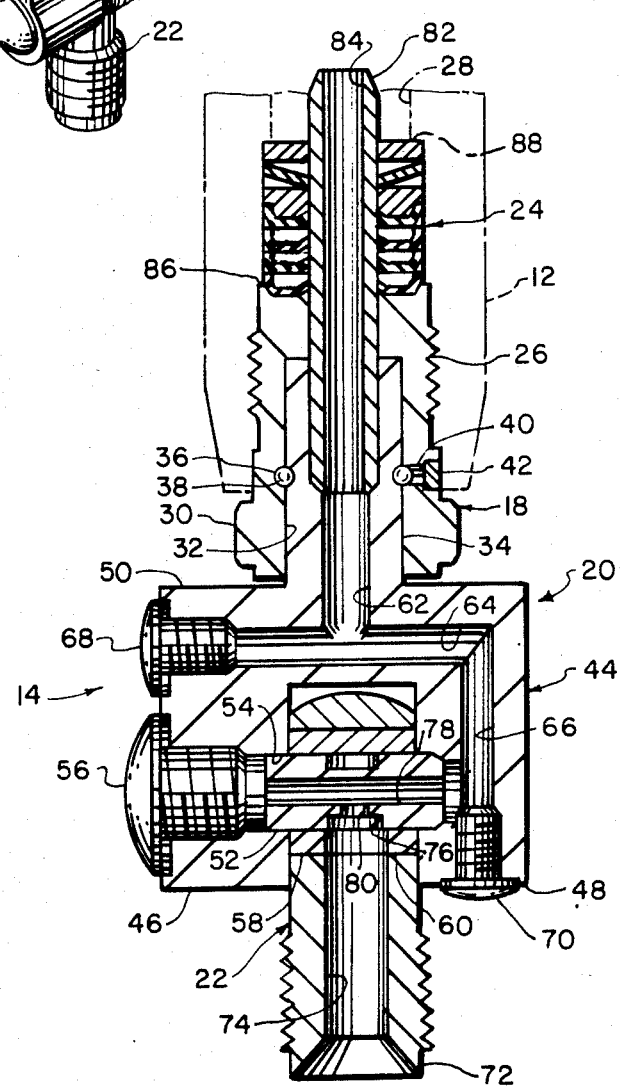
FIG. 2 is an enlarged cross-sectional view of the fluid swivel coupling of the present invention.

Now referring to the drawings, there is shown in FIG. 1 a hand held paint spray gun, generally designated 10, having a handle portion, designated 12, to which a fluid swivel coupling according to the present invention, generally designated 14, is connected. A fluid conduit, such as the hose shown in phantom and designated 16, is connected to the end of swivel coupling 14 opposite the connection to handle portion 12 and serves to deliver liquid paint to spray gun 10. As clearly seen in FIG. 2, fluid swivel coupling 14 is basically comprised of four elements, a swivel housing, designated 18, a spindle assembly, designated 20, a fluid conduit connector, designated 22, and a fluid seal assembly, designated 24. Swivel housing 18 is provided with male screw threads, generally designated 26, for the purpose of threadably engaging swivel housing 18 with a suitable fluid conduit or within bore 28 of handle portion 12 (shown in phantom) of a spray gun. Wrench flats, designated 30 are provided on swivel housing 18 for the purpose of facilitating securement with handle portion 12. Axial bore 32 is provided in swivel housing 18 and is adapted to accept for rotational movement therein the spindle, designated 34, of spindle assembly 20. The surface of spindle 34 and the surface of bore 32 of swivel housing 18 are provided with complementary annular grooves which, when aligned as in FIG. 2, form a bearing race, designated 36, into which ball bearings 38 are positioned via insertion through opening 40 in swivel housing 18. Opening 40 may be sealed by means of plug 42 subsequent to the insertion of a sufficient number of ball bearings to fill race 36. While ball bearings 38 restrain axial movement of spindle assembly 20 with respect to swivel housing 18 they also facilitate the rotational or swivel movement of spindle 34 within bore 32 and hence of spindle assembly 20 with respect to spindle housing 12.

Spindle assembly 20 further includes a substantially "U" shaped yoke, generally designated 44, extending from spindle 34. Yoke 44 is provided with parallel spaced apart arms, designated 46 and 48, interconnected by connecting link 50 to which spindle 34 is joined. Spindle 34 is preferably in the same plane as parallel arms 46 and 48 and preferably is centrally positioned on link 50 such that yoke 44 is balanced thereabout. Fluid conduit connector 22 is pivotally mounted for transverse rotational movement between arms 46 and 48 of yoke 44 by being mounted onto pivot pin 52 extending between arms 46 and 48. Pin 52 is formed of a hard, wear resistant material, such as tungsten carbide, ceramic, etc. and is positioned extending between arms 46 and 48 by being press fitted into a suitable bore 54 which extends entirely through arm 46 and partially through arm 48. The open end of bore 54 in arm 46 may be capped by any suitable means such as screw 56 as shown. In order to prevent undue wear as a result of the rotational movement of connector 22 on pivot pin 52, the mounting surface of connector 22 is comprised of a bushing, generally designated 58, also formed of a hard, wear resistant material such as tungsten carbide, ceramic, etc., which is pres fitted into transverse bore 60 of connector 22. In order to present a fluid tight seal between pin 52 and bushing 58 the clearance therebetween is preferably no greater than 0.0001 inches. However, it has been found that in the case of some heavy fluid materials the clearance may be as great as 0.001 inches.

An uninterrupted continuous fluid pasageway is provided through swivel coupling 14 between its connection to spray gun 10 and its connection to fluid conduit 16. This fluid passageway is comprised of a series of bores and channels which maintain uninterrupted communication throughout the range of movement of swivel coupling 14. Thus, axial fluid bore 62 is provided in spindle 34 intersecting with transverse fluid bore 64 in link 50 of yoke 44, bore 64 in turn converges with axial fluid bore 66 in arm 48 of yoke 44. Bores 64 and 66 may be easily formed by drillings into link 50 and arm 48, respectively, and their origins may be capped by any suitable means, such as screws 68 and 70 as shown. As clearly seen in FIG. 2, fluid conduit connector 22 includes a threaded nipple, designated 72, which extends from the mounting of connector 22 to yoke 44 and which is provided with an axial fluid bore 74 which passes through one side of bushing 58. The terminus of bore 74 coincides with an annular channel, designated 76, provided in pivot pin 52. Pin 52 is provided with an axial fluid bore, designated 78, which communicates with bore 66 in arm 48. Transverse bore 80 in pin 52 provides a connecting fluid passageway between channel 76 and bore 78. Thus, continuous communication is provided between bore 78 of pivot pin 52 and bore 74 of connector 22 throughout the rotational movement of connector 22 with respect to pin 52. The end of swivel coupling 14 which is engaged with spray gun 10 is provided with a stem, designated 82, press into spindle 34 and extending into bore 28 of spray gun handle 12. Stem 82 is provided with a longitudinal bore therethrough, designated 84, which is axially aligned with bore 62 of spindle 34. Packing 24 surrounds stem 82 and establishes a fluid tight seal between bore 28 of spray gun handle 12 and swivel coupling 14 because of the compressive engagement of packing 24 between the end, designated 86, of swivel housing 18 and the shoulder, designated 88, in bore 28 of spray gun handle 12. The effectiveness of this seal may be varied by threadably adjusting swivel housing 18 with respect to spray gun handle 12 thereby varying the compressive force acting upon packing 24 which, because of its resiliency, expands or contracts radially inwardly and outwardly.

Figure 3:
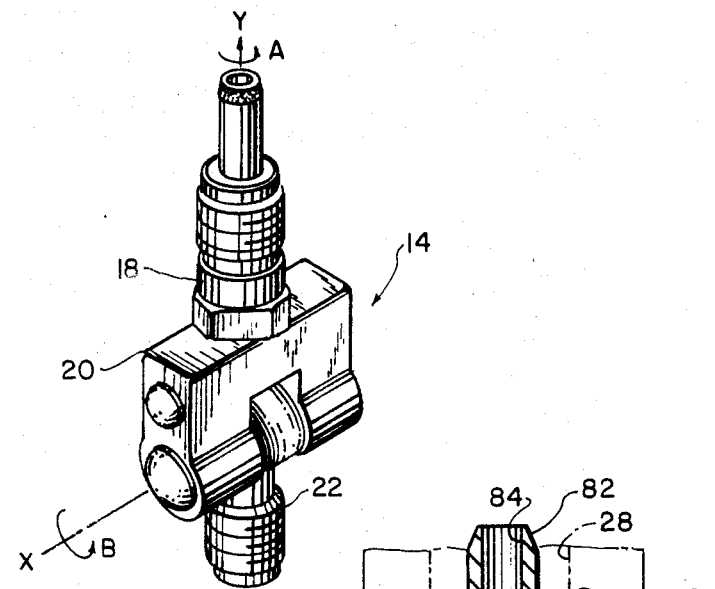
FIG. 3 is a perspective view of the fluid swivel coupling of the present invention.

As clearly seen in FIG. 3, swivel 14 is constructed so that its moving parts revolve about two intersecting and perpendicular axes. For ease of description the horizontal axis is designated the "X" axis and the vertical axis is designated the "Y" axis. Thus, the "Y" axis defines the axis of rotation of spindle 34 and hence of spindle assembly 20 as indicated by the direction arrow "A". The positioning within spindle assembly 20 of pivot pin 52, about which fluid conduit connector 22 rotates, is such that is axis its aligned with that of horizontal axis "X". Thus, the "X" axis defines the axis of rotation of fluid conduit connector 22 as indicated by the direction arrow "B".

In operation, when swivel 14 is connected between spray gun 10 and fluid conduit 16, as in FIG. 1, and paint under high pressure is supplied via fluid conduit 16, the paint passes through fluid bore 74 of connector 22, thence into channel 76 of pin 52, thence through transverse bore 80 of pivot pin 52 and into fluid bore 78 of pivot pin 52. From bore 78 the paint passes through fluid bore 66 in arm 48, thence through fluid bore 64 in connecting link 50, thence through fluid bore 62 in spindle 34 and thence through fluid bore 84 in stem 82. From bore 84 in stem 82 the paint is delivered to bore 28 in spray gun handle 12. It is obvious from the previous description that during the operation of spray gun 10 the operator, because of swivel 14, has great versatility in the maneuverability of spray gun 10 vis à vis fluid conduit 16.

It is to be understood that the foregoing general and detailed descriptions are explanatory of the present invention and are not to be interpreted as restrictive of the scope of the following claims.

What is claimed is:

1. A fluid swivel coupling for interconnecting a first fluid conduit and a second fluid conduit comprising:
   (a) a spindle member;
   (b) a yoke extending from said spindle member having parallel spaced apart arms;
   (c) a fluid conduit connector connected to said first fluid conduit;
   (d) a pivot pin extending between the parallel arms of said yoke for pivotally mounting said fluid conduit connector for transverse rotational movement between said parallel arms defining a first range of movement of said fluid swivel;
   (e) a spindle body connected to said second fluid conduit having an axial bore therethrough for accepting said spindle member and including means for attaching said spindle member so that said spindle body rotates on said spindle about their common axis defining a second range of movement of said fluid swivel; and
   (f) a fluid passageway in said fluid swivel coupling interconnecting said first and second fluid conduits which is continuous and uninterrupted througnout the first and second ranges of movement of said fluid swivel.

2. The fluid swivel coupling as defined in claim 1 wherein the fluid passageway in said coupling includes an axial bore in said spindle member communicating with an axial bore in at least one arm of said yoke which in turn communicates with an axial bore in said pivot pin and which further includes fluid communicating means between said pivot pin bore and an axial bore in said fluid conduit connector which is continuous and uninterrupted throughout the rotational movement of said fluid conduit connector.

3. The fluid swivel coupling as defined in claim 2 wherein said fluid communicating means between said pivot pin bore and said axial bore in said fluid conduit connector includes an external annular channel in said pivot pin aligned with the axial bore in said fluid conduit connector and a fluid passageway connecting said channel with said pivot pin bore.

4. The fluid swivel coupling as defined in claim 3 wherein a bushing is provided in said fluid conduit connector for mounting on said pivot pin with a clearance therebetween and said bushing and said pivot pin are formed of a hard, wear resistant material.

5. The fluid swivel coupling as defined in claim 4 wherein the clearance between said pivot pin and said bushing provides a fluid tight seal therebetween.

6. The fluid swivel coupling as defined in claim 5 wherein the clearance between said pivot pin and said bushing is no greater than 0.0001 inches.

7. The fluid swivel coupling as defined in claim 4 wherein said bushing and said pivot pin are formed of tungsten carbide.

8. The fluid swivel coupling as defined in claim 4 wherein said bushing and said pivot pin are formed of ceramic material.

9. The fluid swivel coupling as defined in claim 1 wherein the means for attaching said spindle member in the axial bore of said spindle body includes an external annular groove in said spindle member, an internal annular groove in said spindle body, the alignment of said grooves defining a race, and a series of ball bearings housed in said race.

10. The fluid swivel coupling as defined in claim 1 wherein the axis of rotation of said fluid conduit connector on said pivot pin is perpendicular to the axis of rotation of said spindle member in said spindle body.

11. A fluid swivel coupling for interconnecting a first fluid conduit and a second fluid conduit comprising:
   (a) a spindle member having an axial bore opening at a first end of said spindle member;
   (b) a yoke extending from a second end of said spindle member having spaced apart parallel arms and including a fluid bore in at least one of said arms communicating with the fluid bore in said spindle member;
   (c) a pivot pin formed of a hard, wear resistant material, extending between the parallel arms of said yoke and including an axial fluid bore therein communicating with the fluid bore in the arm of said yoke, said pivot pin further including an external annular channel and a fluid passageway in said channel communicating with the axial fluid bore in said pivot pin;
   (d) a fluid conduit connector connected to said first fluid conduit and pivotally mounted by means of a bushing formed of a hard, wear resistant material, onto said pivot pin for transverse rotational movement between the parallel arms of said yoke, said pivot pin and said bushing defining a clearance therebetween, said fluid conduit connector including an axial fluid bore therein aligned with the annular channel in said pivot pin and communicating with said first fluid conduit; and
   (e) a spindle body connected to said second fluid conduit having an axial bore therethrough for accepting said spindle member and including means for attaching said spindle member so that said spindle body rotates on said spindle member about their common axis.

12. The fluid swivel coupling as defined in claim 11 wherein the means for attaching said spindle member in the axial bore of said spindle body includes an external annular groove in said spindle member, an internal annular groove in said spindle body, the alignment of said grooves defining a race, and a series of ball bearings housed in said race.

13. The fluid swivel coupling as defined in claim 11 wherein the clearance between said pivot pin and said bushing provides a fluid tight seal therebetween.

14. The fluid swivel coupling as defined in claim 13 wherein the clearance between said pivot pin and said bushing is no greater than 0.0001 inches.

15. The fluid swivel coupling as defined in claim 11 wherein said bushing and said pivot pin are formed of tungsten carbide.

16. The fluid swivel coupling as defined in claim 11 wherein said bushing and said pivot pin are formed of ceramic material.

17. The fluid swivel coupling as defined in claim 11 wherein the axis of rotation of said fluid conduit connector on said pivot pin is perpendicular to the axis of rotation of said spindle member in said spindle body.

* * * * *